United States Patent
Foley et al.

(10) Patent No.: US 10,671,578 B2
(45) Date of Patent: Jun. 2, 2020

(54) SYSTEM AND METHOD FOR DYNAMICALLY ESTIMATING DATA CLASSIFICATION JOB PROGRESS AND EXECUTION TIME

(71) Applicant: International Business Machines Corporation, Armonk, NY (US)

(72) Inventors: Sean C. Foley, Chelmsford, MA (US); Shuyan He, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 15/379,863

(22) Filed: Dec. 15, 2016

(65) Prior Publication Data
US 2018/0173735 A1   Jun. 21, 2018

(51) Int. Cl.
| | |
|---|---|
| G06F 16/21 | (2019.01) |
| G06F 16/28 | (2019.01) |
| G06F 11/34 | (2006.01) |

(52) U.S. Cl.
CPC ........ *G06F 16/217* (2019.01); *G06F 11/3409* (2013.01); *G06F 11/3452* (2013.01); *G06F 11/3457* (2013.01); *G06F 16/285* (2019.01)

(58) Field of Classification Search
CPC .. G06F 17/18; G06F 11/3452; G06F 11/3457; G06F 11/3409; G06F 17/30474;

(Continued)

(56) References Cited

U.S. PATENT DOCUMENTS

| | | | |
|---|---|---|---|
| 5,694,591 A | 12/1997 | Du et al. | |
| 5,734,884 A * | 3/1998 | Eberhard | ................ G06F 11/34 |

(Continued)

OTHER PUBLICATIONS

Revankar, Mehul, "Auditing Multiple Databases with Nessus in a Single Scan," Tenable Network Security, Mar. 27, 2015, pp. 1-7.

(Continued)

*Primary Examiner* — David T. Brooks
(74) *Attorney, Agent, or Firm* — Pepper Hamilton LLP (57) ABSTRACT

Embodiments can provide a computer implemented method in a data processing system comprising a processor and a memory comprising instructions, which are executed by the processor to cause the processor to implement a system for providing classification job estimation for a data security platform comprising one or more data sources, the method comprising: for each of the one or more data sources: counting the number of databases; counting the number of tables in each database; selecting a random database; selecting a random table within the random database; retrieving a database data sample from the random table; measuring one or more latencies associated with issuing and retrieving the database data sample; measuring a processing time required to evaluate the database data sample against one or more policy rules; compiling one or more mean times for the latencies and processing times; and calculating a data source scan time using the one or more mean times and the number of tables in each database; and calculating a total estimation time through summation of each of the one or more data source scan times compiled for each of the one or more data sources.

12 Claims, 5 Drawing Sheets

(58) Field of Classification Search
CPC .. G06F 11/3419; G06F 11/34; G06F 11/3404; G06F 11/3442; G06F 16/285; G06F 16/35; G06F 16/353; G06F 16/355; G06F 16/45; G06F 16/55; G06F 16/65; G06F 16/75; G06F 16/906; G06F 16/217
See application file for complete search history.

(56) References Cited

U.S. PATENT DOCUMENTS

| | | | | |
|---|---|---|---|---|
| 6,026,391 | A * | 2/2000 | Osborn | G06F 17/30306 |
| 6,728,957 | B1 | 4/2004 | Nakazato | |
| 7,155,428 | B1 * | 12/2006 | Brown | G06F 17/30445 |
| 7,249,128 | B2 | 7/2007 | Chess et al. | |
| 7,505,933 | B1 | 3/2009 | Gutierrez et al. | |
| 8,375,020 | B1 * | 2/2013 | Rogers | G06F 16/48 |
| | | | | 707/708 |
| 9,275,107 | B2 | 3/2016 | Hagenbuch et al. | |
| 9,390,240 | B1 * | 7/2016 | Brisebois | G06F 21/31 |
| 2003/0088579 | A1 * | 5/2003 | Brown | G06F 17/30595 |
| 2005/0222965 | A1 * | 10/2005 | Chaudhuri | G06F 17/30306 |
| 2006/0282404 | A1 * | 12/2006 | Chaudhuri | G06F 17/30474 |
| 2008/0306903 | A1 * | 12/2008 | Larson | G06F 17/30536 |
| 2010/0082599 | A1 * | 4/2010 | Graefe | G06F 16/217 |
| | | | | 707/713 |
| 2010/0088305 | A1 * | 4/2010 | Fournier | G06F 21/552 |
| | | | | 707/706 |
| 2011/0093471 | A1 * | 4/2011 | Brockway | G06F 17/30616 |
| | | | | 707/747 |
| 2011/0225533 | A1 * | 9/2011 | Kuno | G06F 17/30445 |
| | | | | 715/772 |
| 2012/0166442 | A1 * | 6/2012 | Furuichi | G06F 16/353 |
| | | | | 707/740 |
| 2013/0226903 | A1 * | 8/2013 | Wu | G06F 16/24542 |
| | | | | 707/719 |
| 2013/0346986 | A1 * | 12/2013 | Goetz | G06F 9/485 |
| | | | | 718/102 |
| 2014/0089270 | A1 * | 3/2014 | Shaft | G06F 17/30371 |
| | | | | 707/690 |
| 2014/0089279 | A1 * | 3/2014 | Gibson | G06F 11/1451 |
| | | | | 707/694 |
| 2014/0115592 | A1 * | 4/2014 | Frean | G06F 9/5027 |
| | | | | 718/102 |
| 2014/0173618 | A1 * | 6/2014 | Neuman | G06F 9/5066 |
| | | | | 718/104 |
| 2014/0280173 | A1 * | 9/2014 | Scholtes | G06F 17/30705 |
| | | | | 707/740 |
| 2014/0324862 | A1 * | 10/2014 | Bingham | G06F 9/45533 |
| | | | | 707/737 |
| 2015/0324606 | A1 * | 11/2015 | Grondin | H04L 63/205 |
| | | | | 726/1 |
| 2016/0306812 | A1 * | 10/2016 | McHenry | G06Q 10/10 |
| 2018/0107838 | A1 * | 4/2018 | Amarendran | G06F 21/6245 |

OTHER PUBLICATIONS

Broneske, David at al., Database Scan Variants on Modern CPUs: A Performance Study, Memory Data Management and Analysis, Springer International Publishing, 2015, pp. 1-15.
Page, "Configuring Database System," LISA. 1998.
Boral et al., "A methodology for database system performance evaluation," ACM SIGMOD Record 14(2), Jan. 2001.

* cited by examiner

SYSTEM AND METHOD FOR DYNAMICALLY ESTIMATING DATA CLASSIFICATION JOB PROGRESS AND EXECUTION TIME

TECHNICAL FIELD

The present application relates generally to a system and method that can be used to dynamically estimate the execution progress and total execution time for a given data scanning system at a particular time/state.

BACKGROUND

A classifier is a search engine and reporting tool that aids highlighting and finding critical data by searching through data sources of different types, as well as allowing a user to find out what user has what grant-type permissions on tables, synonyms, system tables, and views. Many classifiers are designed to meet Sarbanes-Oxley compliance for sensitive data retrieval, as well as to facilitate finding answers to the critical questions a database manager might have about where data is located and who has permissions to this data.

Current data classification jobs do not have any capabilities to provide end users with status updates regarding how much the job has progressed and when the job will complete. Users often encounter many challenges and questions, including the following examples:
1. The job still isn't completed, is it still running or stuck?
2. When the job will complete so that the next job can be started?
3. Should the user cancel a long-running job and reschedule it to another time when there is less system activity?

There are no straight-forward formulas in current database or classification applications that can help solve the questions mentioned above. Typically, a user must guess how long the job will take based on his/her knowledge about the complexity of classification rules and the volume or characteristics of the data sources being analyzed. However, it is not practical to use this manual approach, as the execution time depends on many factors that are unable to be foreseen. For instance, the manual approach does not work if the performance and execution time highly depends on a particular condition (such as another job being performed while the user's job is running, if the statistics of the source data are up to date, etc.). If these opaque conditions apply, there is no way for a user to predict or estimate accurately when the classification job will complete, especially if the system state changes.

SUMMARY

Embodiments can provide a computer implemented method in a data processing system comprising a processor and a memory comprising instructions, which are executed by the processor to cause the processor to implement a system for providing classification job estimation for a data security platform comprising one or more data sources, the method comprising: for each of the one or more data sources: counting the number of databases; counting the number of tables in each database; selecting a random database; selecting a random table within the random database; retrieving a database data sample from the random table; measuring one or more latencies associated with issuing and retrieving the database data sample; measuring a processing time required to evaluate the database data sample against one or more policy rules; compiling one or more mean times for the latencies and processing times; and calculating a data source scan time using the one or more mean times and the number of tables in each database; and calculating a total estimation time through summation of each of the one or more data source scan times compiled for each of the one or more data sources.

Embodiments can further provide a method further comprising running a classification job on the data security platform; displaying a current progress of the classification job to a user; and displaying the total estimation time of the classification job to the user.

Embodiments can further provide a method further comprising sampling data from the one or more data sources; running the one or more policy rules against the sampled data; flagging matches of sensitive data; and storing results in a data storage.

Embodiments can further provide a method further comprising configuring, through a user device, the one or more policy rules.

Embodiments can further provide a method further comprising selecting, through a user device, the one or more data sources to be searched.

Embodiments can further provide a method further comprising retrieving a database data sample from the random table based upon one or more parameters of a particular classification job.

Embodiments can further provide a computer implemented method in a data processing system comprising a processor and a memory comprising instructions, which are executed by the processor to cause the processor to implement a system for providing classification job estimation for a data security platform comprising one or more data sources, the method comprising: for each of the one or more data sources: counting the number of databases; counting the number of tables in each database; selecting a random database; selecting a random table within the random database; retrieving a database data sample from the random table; measuring one or more latencies associated with issuing and retrieving the database data sample; importing one or more predefined complexity levels associated with one or more policy rules; compiling one or more mean times for the latencies and processing times; and calculating a data source scan time using the one or more mean times and the number of tables in each database; and calculating a total estimation time though summation of each of the one or more data source scan times compiled for each of the one or more data sources.

Embodiments can further provide a method further comprising running a classification job on the data security platform; displaying a current progress of the classification job to a user; and displaying the total estimation time of the classification job to the user.

Embodiments can further provide a method further comprising sampling data from the one or more data sources; running the one or more policy rules against the sampled data; flagging matches of sensitive data; and storing results in a data storage.

Embodiments can further provide a method further comprising configuring, through a user device, the one or more policy rules.

Embodiments can further provide a method further comprising selecting, through a user device, the one or more data sources to be searched.

Embodiments can further provide a method further comprising retrieving a database data sample from the random table based upon one or more parameters of a particular classification job.

Embodiments can further provide a method further comprising deriving the one or more predefined complexity levels from one or more performance factors, wherein the performance factors are selected from at least one of: classification job characteristics, performance of the one or more data sources; characteristics of a data security platform appliance; characteristics of the one or more data sources; and characteristics of network traffic.

Embodiments can further provide a computer implemented method in a data processing system comprising a processor and a memory comprising instructions, which are executed by the processor to cause the processor to implement a system for providing classification job estimation for a data security platform comprising one or more data sources, the method comprising: importing one or more definitions; generating one or more general estimations of classification job completion times based upon analysis of the one or more definitions; generating one or more result metrics based upon the one or more general estimations of classification job completion times; inputting particular classification job parameters; and calculating a total estimation time of the particular classification job based upon the general estimations of classification job completion times and the one or more result metrics.

Embodiments can further provide a method further comprising running a classification job on the data security platform; displaying a current progress of the classification job to a user; and displaying the total estimation time of the classification job to the user.

Embodiments can further provide a method further comprising sampling data from the one or more data sources; running the one or more policy rules against the sampled data; flagging matches of sensitive data; and storing results in a data storage.

Embodiments can further provide a method further comprising configuring, through a user device, the one or more policy rules.

Embodiments can further provide a method further comprising generating one or more general estimations of classification job completion times based upon at least one of: the analysis of the one or more definitions, a number of databases per data source, a number of tables per database, a number of columns and rows per table, and one or more predefined complexity levels per policy rule.

Embodiments can further provide a method further comprising importing one or more definitions comprising at least one of: baseline results, current results, result metrics, factors, variables, constants, and test scenarios.

Embodiments can further provide a method further comprising generating one or more result metrics based upon the one or more general estimations of classification job completion times, wherein the result metrics comprise at least one of: successful execution, execution time, maximum processor percentage, maximum memory, and disk space consumed.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention describes a system and method to improve a data security platform classification job to dynamically estimate the job progress and execution time. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/ processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention allows a user to better plan, utilize, and optimize a data security platform appliance and resources. In an embodiment, a user can select a dry run to predict the execution time based on estimation using one or more dynamic factors, or can directly execute the data security platform classification job and observe or monitor the estimate of execution time in real-time as the job is executed. Based on the estimated execution, the user can choose to stop the job and reschedule it to run at another suitable time or allow the job to complete.

Figure 1:
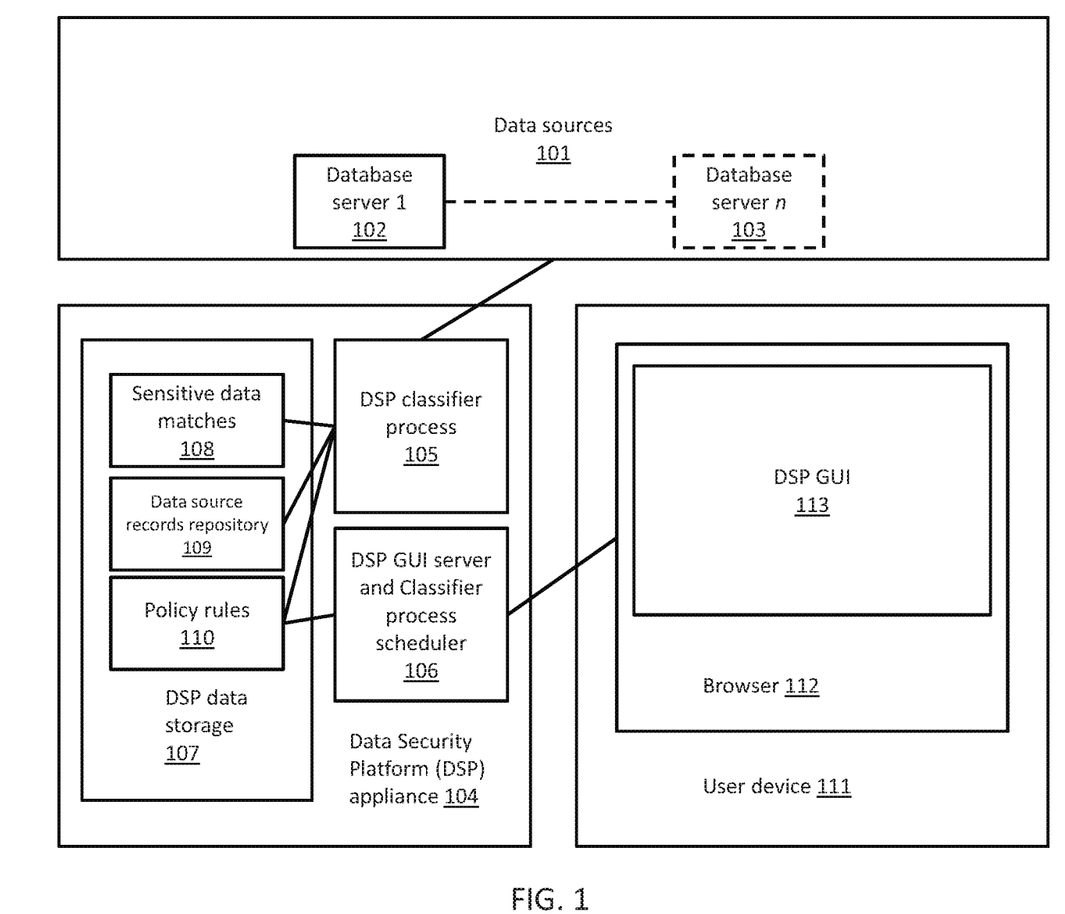
FIG. 1 depicts a schematic diagram of one illustrative embodiment of a classification job estimation system, in accordance with embodiments described herein.

FIG. 1 depicts a schematic diagram of one illustrative embodiment of a classification job estimation system, in accordance with embodiments described herein. A data security platform (DSP) classification job can sample any number of data sources 101 in a customer environment as configured by a user. In an embodiment, data sources 101 can be one or more database servers 102, 103. The classification job functionality can be governed through the use of a data security platform (DSP) appliance 104, which can comprise a DSP classifier process 105, a DSP GUI server and classifier process scheduler 106, as well as DSP data storage 107. The DSP data storage can contain data necessary for the effective functioning of multiple classification jobs, including sensitive matching data 108, data source records repository 109, and a repository of policy rules 110. The policy rules 110 can look for data patterns and other data characteristics in order to determine if there is sensitive data contained within a particular data source 101 or set of data sources 101. The classifier process 105 can run a simplified classification job by sampling data from database servers 102, running the policy rules 110 against the sampled data, flagging matches of sensitive data 108, and storing the results in the DSP data storage 107.

The classification job can be initiated through the use of the data security platform GUI 113, which can display through a browser 112 on a user device 111. Through the user device 111, a user can initiate a classification job, configure policy rules 110, configure data sources 101, and can schedule other classification jobs. Additionally, the user device 111, through the browser 112 displaying the DSP GUI 113, can be used to display updates and classification job estimations that are created according to embodiments described further herein. The user device 111, data sources 101, and DSP appliance 104 can be interconnected through an internet or intranet network.

Figure 2:
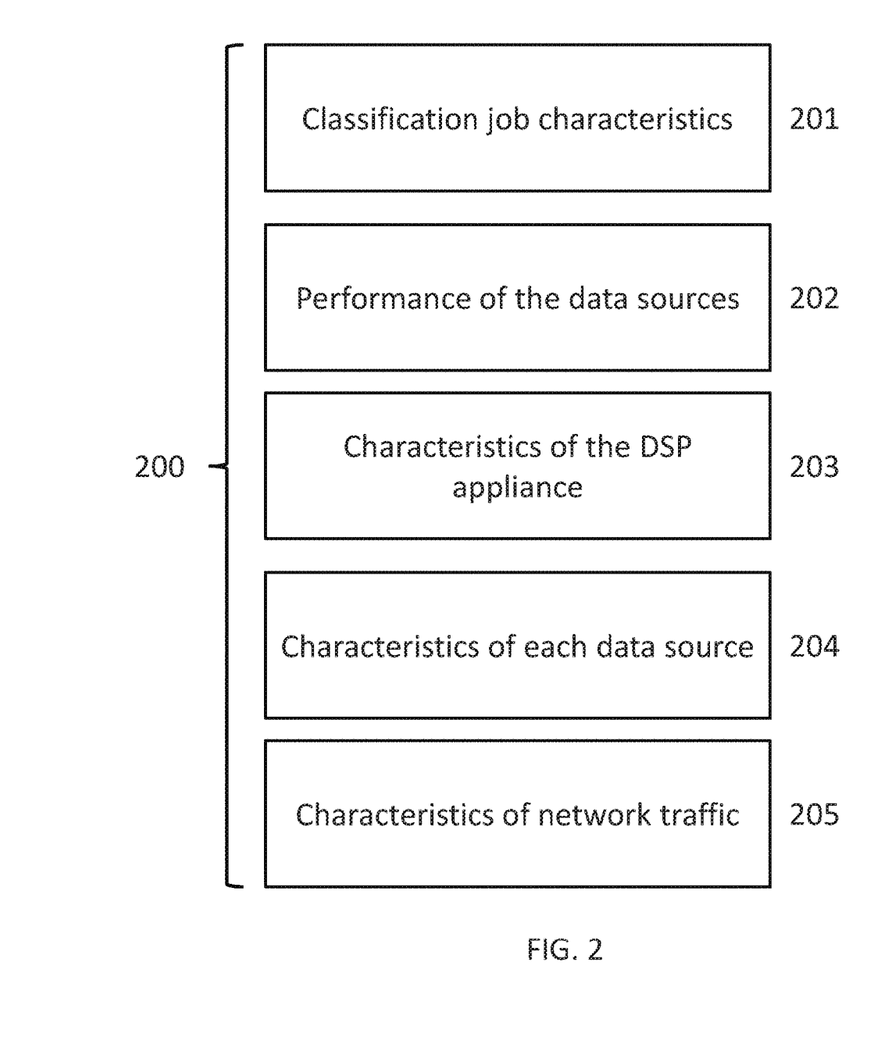
FIG. 2 depicts a block diagram illustrating performance factors that can affect the performance of a data security platform classification job, in accordance with embodiments described herein.

FIG. 2 depicts a block diagram illustrating performance factors 200 that can affect the performance of a data security platform classification job, in accordance with embodiments described herein. Performance factors 200 can include the classification job characteristics 201, which can include, but are not limited to: the number of policy rules, the complexity of logic in each rule, and the number of data sources. Performance factors 200 can also include the performance of each data source 202, including, but not limited to: the data source's processing capacity, operating system, amount of random access memory, and disk write/read speeds. Performance factors 200 can also include the characteristics of the DSP appliance running the classification job 203, including, but not limited to: the DSP appliance's processing capacity, operating system, amount of random access memory, and disk write/read speeds. Performance factors 200 can also include the characteristics of each data source 204, including, but not limited to: the number of databases in the data source, the number of tables in each database, the number of columns/rows in each table, and whether any optimizations of the database, such as indexes or previously computed statistics, are present. Performance factors 200 can also include characteristics of network traffic 205 for doing database samples, which can include, but are not limited to: network congestion and latency values.

Figure 3:
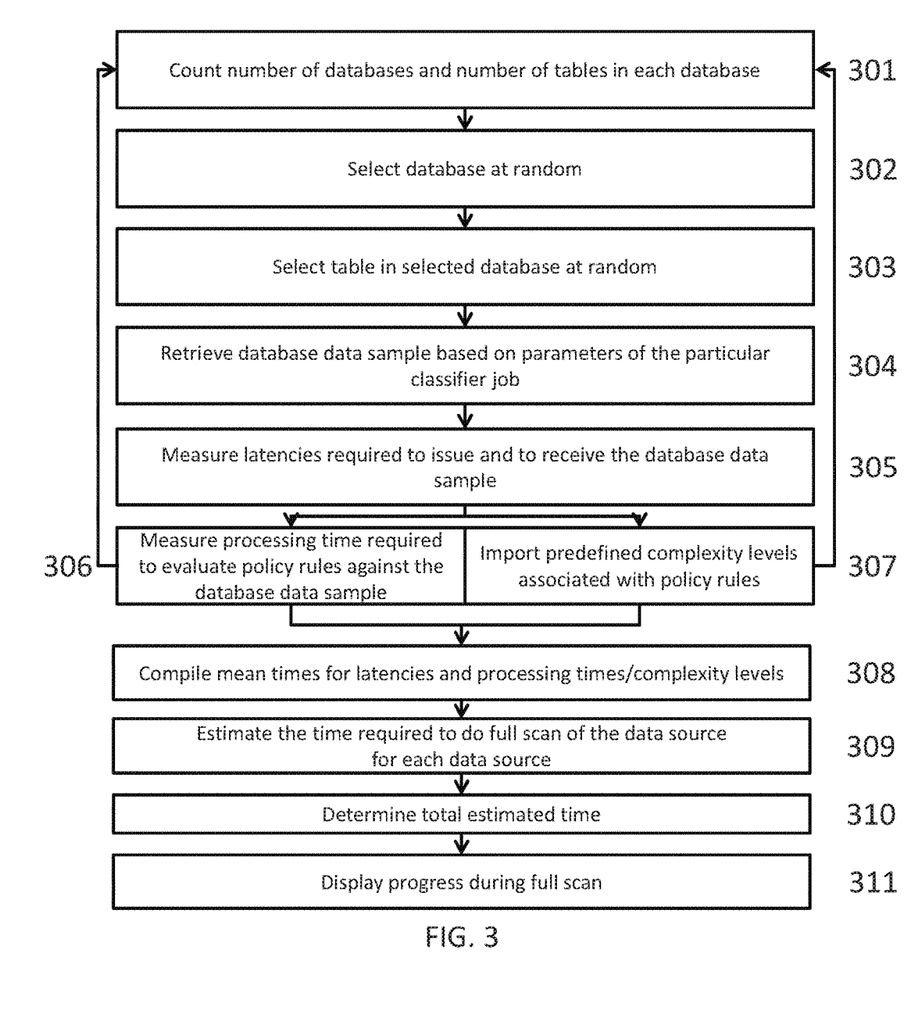
FIG. 3 depicts a block diagram illustrating the functionality of a classification job estimation system, in accordance with embodiments described herein.

FIG. 3 depicts a block diagram illustrating the functionality of a classification job estimation system, in accordance with embodiments described herein. In an embodiment, the classification job estimation system can perform a full dry-run of the classification job using all data sources, creating estimates that can be compiled for each component. For each data source, the classification job estimation system can begin by counting the number of databases present, as well as the number of tables in each database 301. The system can then select a random database in the data source 302. From the selected database, the system can then select a table at random 303.

From the selected table, the system can retrieve a database data sample based on the parameters of the particular classification job 304. The parameters can specify the requirements of the particular classification job, including how to sample, whether to use full scan, a selection of rows, sequential selection, or other known database sampling techniques. The system can then measure the latencies required to issue and to receive the database data sample 305. The system can then measure the processing time required to evaluate the policy rules against the collected database data sample 306.

The system can then repeat the steps of counting the number of databases and tables 301, selecting random databases 302, selecting random tables 303, retrieving a database data sample 304, measuring latencies 305, and measuring the processing time required for evaluation 306 a pre-determined number of times, in order to compile mean times for data source latencies and processing times for each data source on the DSP appliance 308. The system can then use the compiled mean times, as well as the total number of tables to be scanned, to estimate the time required to do a full scan of the data source for each data source 309. By summing the estimated times, the system can determine a total estimated time 310. In an embodiment, the system can display the progress of a classification job and the newly calculated estimated time to the user while the full scan is running 311.

In an alternate embodiment, the system can import predefined complexity levels associated with policy rules 307 instead of measuring the actual processing time required to evaluate the policy rules against the database data sample 306. The predefined complexity levels can be derived from an analysis of the performance factors discussed in FIG. 2. The predefined complexity levels can correspond to various processing times, and can be used by the system in its compilation of the mean times for use in calculating the total estimated time. Using the predefined complexity levels can produce less detailed information, but can increase the system speed at producing estimation.

Figure 4:
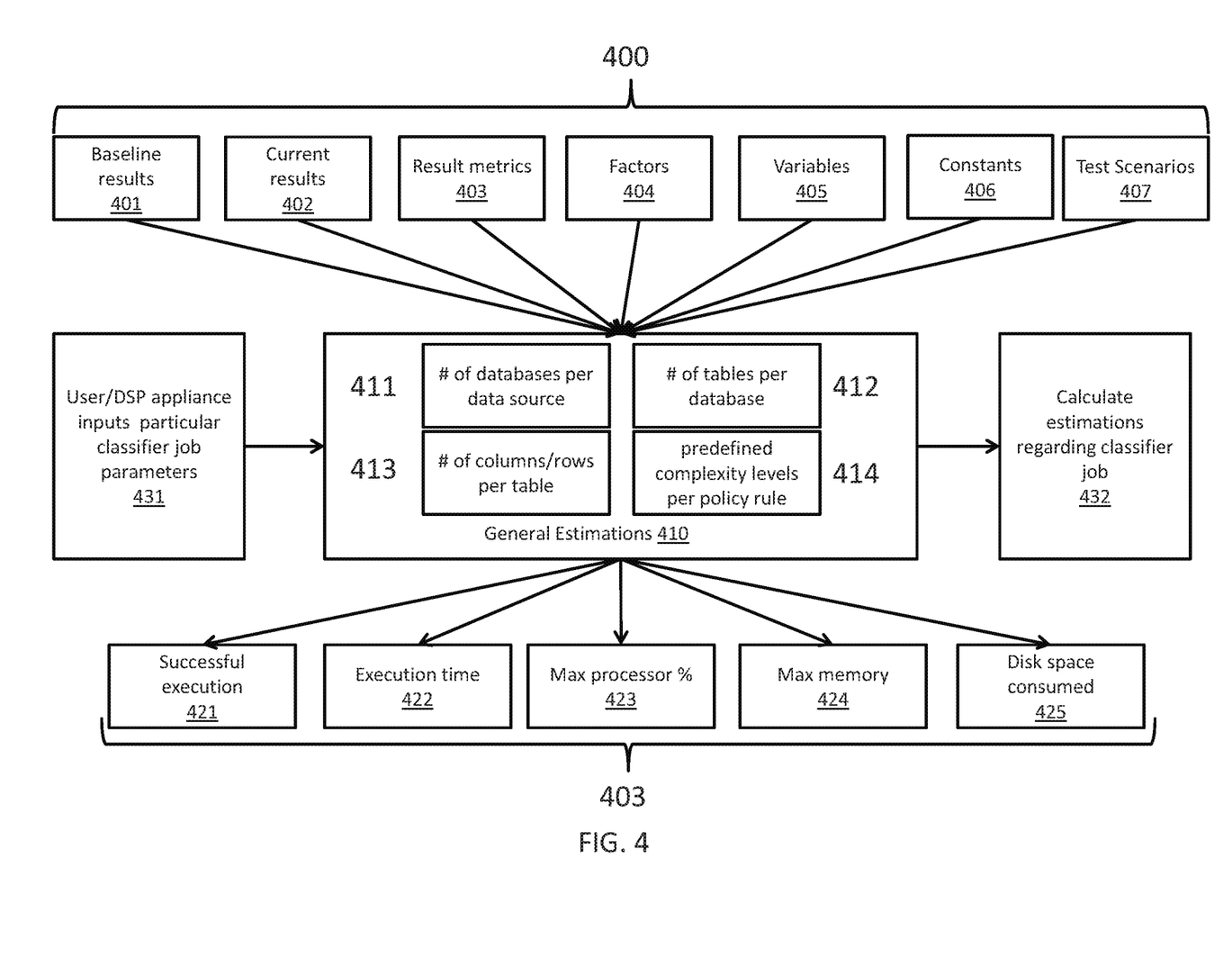
FIG. 4 depicts a block diagram illustrating the functionality of a classification job estimation system, in accordance with embodiments described herein.

FIG. 4 depicts a block diagram illustrating the functionality of a classification job estimation system, in accordance with embodiments described herein. In an alternate embodiment, the classification job estimation system can forgo a dry run entirely, but instead can use general estimations 410 to produce a rough estimate of the completion time and other parameters of a classification job. The system can import various definitions 400, which can include, but are not limited to: baseline result 401, current result 402, result metric 403, factors 404, variables 405, constants 406, and test scenarios 407. Baseline results 401 can be the standard against which the system is comparing its estimate. Current results 402 can be the results of the current iteration of the estimation. Result metrics 403 can be any pre-determined method for determining a classification job result. Factors 404 can be any factor that can impact performance, such as those factors described in FIG. 2. Variables 405 can include a factor 404 that must be included in the testing parameters. Constants 406 can be any factor 404 that will remain static. Test scenarios 407 can be one or more tests comprising one or more variables 405 that can generate some result.

The system can maintain general estimations 410 based upon following categories of data: number of databases per data source 411, number of tables per database 412, number of columns and rows per table 413, and predefined complexity levels associated with policy rules 414. Using these general estimations 410, which can be pre-measured through dry runs performed in the manner described above in FIG. 3, the system can produce various result metrics 403 for simulated classification jobs. Result metrics 403 can include, but are not limited to: whether execution of the classification job was successful 421, the classification job execution time 422, the maximum processing percentage required to perform the classification job 423, the maximum memory required to perform the classification job 424, and the disk space consumed by performing the classification job 425. Based on the pre-built database and general estimations, the system can have the parameters of the classification job input by the user or the DSP appliance 431, and can use the general estimations 410 to calculate estimations based upon the input classification job parameters that correspond with the result metrics 403 established by the system 432. The general estimations 410 can be refined by the system if the user elects to perform a dry run estimation, where the results of the dry run estimation can be imported into the repository of general estimations 410.

Figure 5:
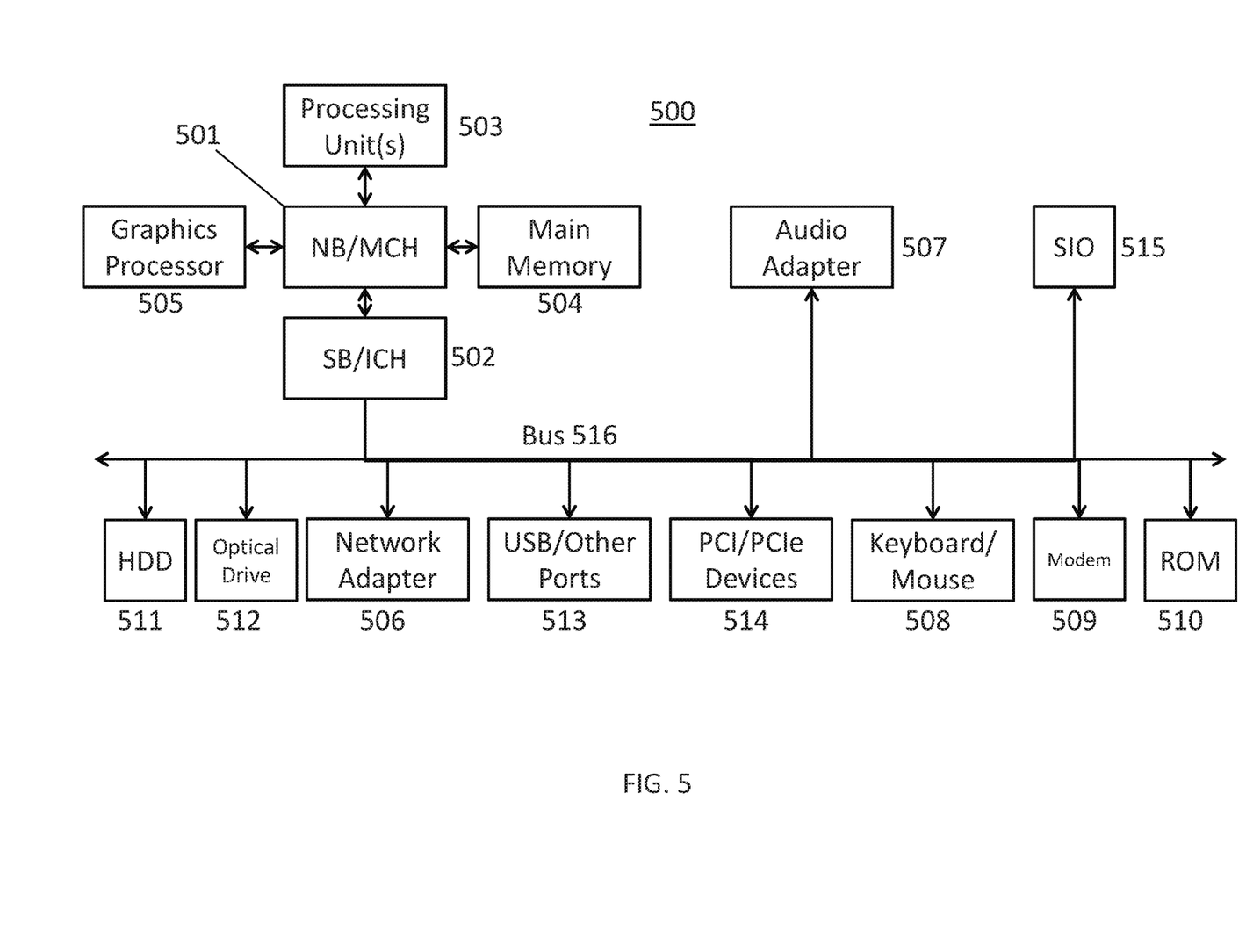
FIG. 5 depicts a block diagram of an example data processing system in which aspects of the illustrative embodiments may be implemented.

FIG. 5 is a block diagram of an example data processing system 500 in which aspects of the illustrative embodiments can be implemented. Data processing system 500 is an example of a computer, such as a server or client, in which computer usable code or instructions implementing the process for illustrative embodiments of the present invention are located. In one embodiment, FIG. 5 represents a server computing device, such as a server, which implements the classification job estimation system described herein.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH through an accelerated graphics port (AGP).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 can connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. The super I/O (SIO) device 515 can be connected to the SB/ICH.

An operating system can run on processing unit 503. The operating system can coordinate and provide control of various components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM® eServer™ System p® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the classification job estimation system can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or network adapter 506 can include one or more devices that can be used to transmit and receive data.

Those of ordinary skill in the art will appreciate that the hardware depicted in FIG. 5 may vary depending on the implementation. Other internal hardware or peripheral devices, such as flash memory, equivalent non-volatile memory, or optical disk drives may be used in addition to or in place of the hardware depicted. Moreover, the data processing system 500 can take the form of any of a number of different data processing systems, including but not limited to, client computing devices, server computing devices, tablet computers, laptop computers, telephone or other communication devices, personal digital assistants, and the like. Essentially, data processing system 500 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a system for providing classification job estimation on a data security platform comprising one or more data sources, the method comprising:

for each of the one or more data sources:
    counting the number of databases;
    counting the number of tables in each database;
    selecting a random database;
    selecting a random table within the random database;
    retrieving a database data sample from the random table;

measuring one or more latencies associated with issuing and retrieving the database data sample based upon a plurality of parameters of a particular classification job including a full scan, a selection of rows, and sequential selection;

importing one or more predefined complexity levels associated with one or more policy rules, wherein each predefined complexity level corresponds to a processing time, wherein the one or more predefined complexity levels are derived from a plurality of performance factors including indexes of each database, network congestion, and network latency values;

compiling one or more mean times for the latencies and processing times; and calculating a data source scan time using the one or more mean times and the number of tables in each database; and calculating a total estimation time through summation of each of the one or more data source scan times compiled for each of the one or more data sources.

2. The method as recited in claim 1, further comprising:
running a classification job on the data security platform;
displaying a current progress of the classification job to a user; and
displaying the total estimation time of the classification job to the user.

3. The method as recited in claim 2, wherein running a classification job on the data security platform further comprises:
sampling data from the one or more data sources;
running the one or more policy rules against the sampled data;
flagging matches of sensitive data; and
storing results in a data storage.

4. The method as recited in claim 2, further comprising:
configuring, through a user device, the one or more policy rules.

5. The method as recited in claim 2, further comprising:
selecting, through a user device, the one or more data sources to be searched.

6. The method as recited in claim 1, further comprising:
retrieving a database data sample from the random table based upon one or more parameters of a particular classification job.

7. A system for providing classification job estimation on a data security platform comprising one or more data sources, comprising:
a processor configured to:
for each of the one or more data sources:
count the number of databases;
count the number of tables in each database;
select a random database;
select a random table within the random database;
retrieve a database data sample from the random table;
measure one or more latencies associated with issuing and retrieving the database data sample based upon a plurality of parameters of a particular classification job including a full scan, a selection of rows, and sequential selection;
import one or more predefined complexity levels associated with one or more policy rules, wherein each predefined complexity level corresponds to a processing time, wherein the one or more predefined complexity levels are derived from a plurality of performance factors including indexes of each database, network congestion, and network latency values;
compile one or more mean times for the latencies and processing times; and
calculate a data source scan time using the one or more mean times and the number of tables in each database; and
calculate a total estimation time through summation of each of the one or more data source scan times compiled for each of the one or more data sources.

8. The system as recited in claim 7, the processor is further configured to:
run a classification job on the data security platform;
display a current progress of the classification job to a user; and
display the total estimation time of the classification job to the user.

9. The system as recited in claim 8, wherein the step of running a classification job on the data security platform further enables the processor to be configured to:
sample data from the one or more data sources;
run the one or more policy rules against the sampled data;
flag matches of sensitive data; and
store results in a data storage.

10. The system as recited in claim 8, the processor is further configured to:
configure, through a user device, the one or more policy rules.

11. The system as recited in claim 8, the processor is further configured to:
select, through a user device, the one or more data sources to be searched.

12. The system as recited in claim 7, the processor is further configured to:
retrieve a database data sample from the random table based upon one or more parameters of a particular classification job.

* * * * *